United States Patent [19]

Gantzert

[11] Patent Number: 5,344,111
[45] Date of Patent: Sep. 6, 1994

[54] ANCHORING DEVICE FOR A WATER HEATER

[76] Inventor: Bob Gantzert, 205 Cleveland Ave., San Jose, Calif. 95126

[21] Appl. No.: 109,668

[22] Filed: Aug. 20, 1993

[51] Int. Cl.⁵ .................................................. E04G 3/00
[52] U.S. Cl. ...................................... 248/274; 248/70; 248/74.1; 248/146
[58] Field of Search ............... 248/274, 313, 146, 154, 248/311.2, 70, 74.1; 211/88

[56] References Cited

U.S. PATENT DOCUMENTS

| 1,022,409 | 4/1912 | Foster | 248/70 |
| 1,050,235 | 4/1913 | Scanlan | 248/74.1 X |
| 2,141,032 | 12/1938 | Cordell | 248/74.1 X |
| 2,790,614 | 4/1957 | Miller | 248/74.1 X |
| 3,506,227 | 4/1970 | Jenkins | 248/70 X |
| 3,528,634 | 9/1970 | Jenkins | 248/70 |
| 4,955,573 | 9/1990 | Horvath | 248/154 X |
| 5,020,760 | 6/1991 | Mayr | 248/313 |
| 5,022,624 | 6/1991 | Hill | 248/68.1 |
| 5,085,387 | 2/1992 | Peterson | 248/154 |
| 5,190,260 | 3/1993 | Daubenspeck | 248/313 |

FOREIGN PATENT DOCUMENTS 3047973 10/1981 Fed. Rep. of Germany ........ 248/70

Primary Examiner—J. Franklin Foss
Attorney, Agent, or Firm—Keith Kline

[57] ABSTRACT

An anchoring device for a water heater comprising two bracket elements. These elements are fastened around the water inlet and outlet pipes near their attachment point to the water heater, where the pipes are very rigid. The bracket elements each comprise two pieces, one of which attaches to the water heater, the other to the adjoining wall. The length of the bracket elements is adjustable so that it will always reach a wall stud.

1 Claim, 1 Drawing Sheet

ANCHORING DEVICE FOR A WATER HEATER

FIELD OF THE INVENTION

The present invention relates generally to devices to secure appliances, and more particularly is an anchoring device for a water heater.

BACKGROUND OF THE INVENTION

All modern homes have a water heater. A water heater is a very heavy appliance, that can cause considerable damage if it is tipped over, either by accidental contact or by an earthquake. In addition to the potential water damage, there is also the very real possibility of an explosion or fire if a gas line is broken.

Accordingly, many devices have been used to secure a water heater to an adjacent wall. Many are rigid elements that are attached at one end to the water heater and at the other end to the wall. The most common device is simply a flexible metal strap looped around the body of the water heater and affixed to the wall.

One problem inherent in using a flexible strap is that it is not very sturdy. The strap often breaks, leaving the water heater unsupported.

A problem inherent in the rigid devices in the prior art is that they generally lack adjustment means to assure a solid attachment to the wall. Unless a stud in the wall happens to be at the appropriate location for the length of the prior art devices, the devices must be anchored into the sheetrock only, and thus do not provide adequate support.

OBJECTS, SUMMARY, AND ADVANTAGES OF THE INVENTION

Accordingly, it is an object of the present invention to provide an anchoring means for a water heater that provides very sturdy support.

It is a further object of the present invention to provide a support that includes adjustment means so that the device may always be anchored to studs in the adjoining wall.

The present invention is an anchoring device for a water heater comprising two bracket elements. These elements are fastened around the water inlet and outlet pipes near their attachment point to the water heater, where the pipes are very rigid. The bracket elements each comprise two pieces, one of which attaches to the water heater, the other to the adjoining wall. The length of the bracket elements is adjustable so that it will always reach a wall stud.

An advantage of the present invention is that it is extremely sturdy. A further advantage of the present invention is that it can be adjusted so that it is always possible to attach the device to wall studs. These advantages together eliminate the possibility of a water heater being toppled in an earthquake or by other means.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
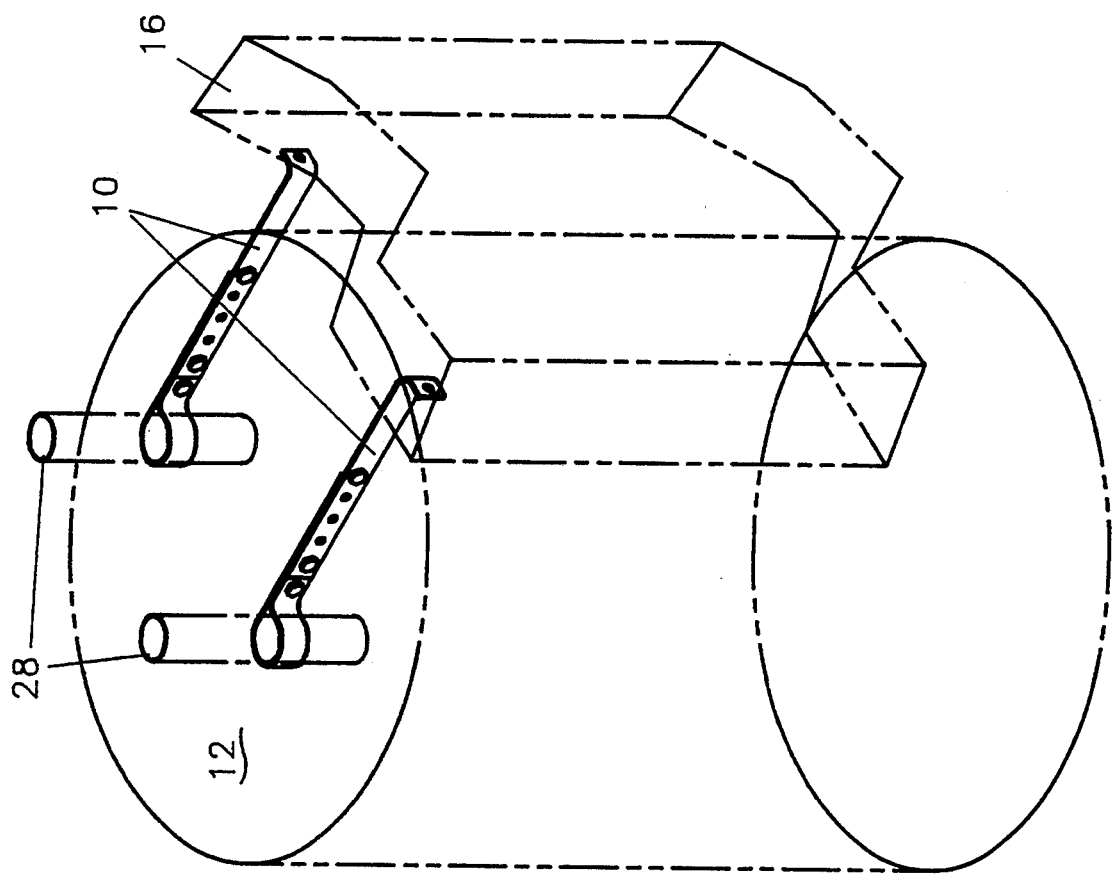
FIG. 1 is a perspective view of the water heater anchoring device of present invention securing a water heater to an adjacent wall.
Figure 2:
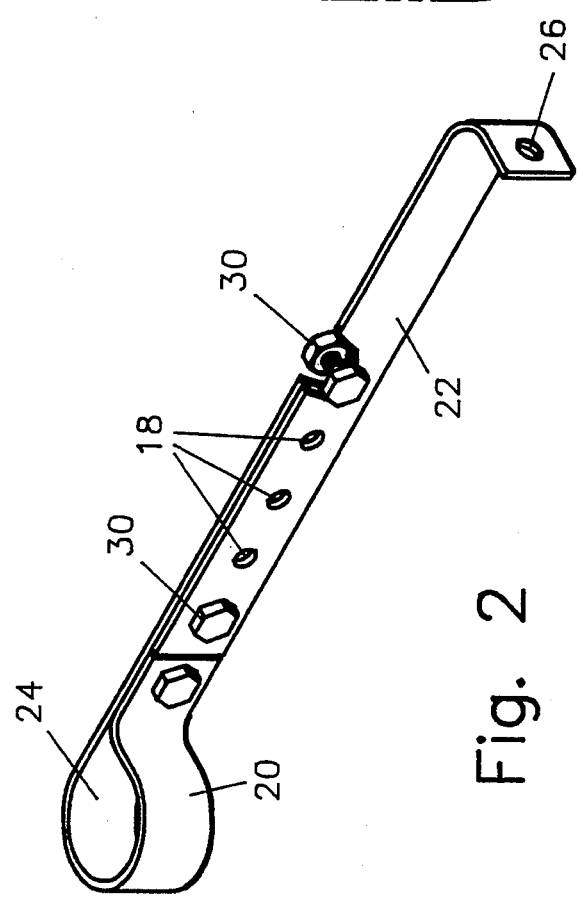
FIG. 2 is a perspective view of one of the anchoring devices.

The present invention is a securing device 10 for a water heater as shown in FIG. 1. The anchoring device 10 is used to secure in position a water heater 12. The securing device 10 comprises two bracket elements 14. The bracket elements 14 affix at a first end to the water heater 12 and at a second end to an adjacent wall 16.

The bracket elements 14 include length adjustment means 18, which in the preferred embodiment comprises a series of holes 18 which pass through both of two pieces of the bracket element 14. The two pieces of the bracket elements 14 are a water heater attachment means 20 and a wall stud attachment means 22, and are joined by bolts 30.

The water heater attachment means 20 in the preferred embodiment includes an openable loop 24 which encircles the inlet and outlet pipes on the water heater 12. The wall stud attachment means 22 in the preferred embodiment includes a flexible mounting portion 26, which extends at an angle from the attachment means 22.

Installation of the device 10 is accomplished as follows: The anchoring device 10 is installed near the attachment points of the inlet and outlet water pipes 28 on the body of the water heater 12 so that the pipes are very rigid at the point of installation. This ensures maximum stability.

The bracket elements 14 are secured to the pipes 28 by the loops 24. Once the bracket elements 14 are installed, two wall studs must be located. If the length of the bracket elements 14 needs to be adjusted so that the mounting portion 26 reaches the stud, the bolts 30 which secure the two pieces of the brackets 14 may be removed and reinstalled in different holes 18 according to the length of the bracket required.

The mounting portion 26 is flexible so that no matter what the contact angle of the attachment means 22 with the wall 16, the mounting elements 26 can be installed flush against the wall 16. This means that no matter how much length adjustment is required for the brackets 14, the device will be securely mounted with the mounting portion 26 parallel to the wall 16.

Lag bolts which pass through openings in the mounting portion 26 are used to securely fasten the brackets 14 to the wall 16. The water heater is then very securely anchored.

In the preferred embodiment of the present invention, steel is used as the material for the construction of the brackets 14. It is readily apparent that any rigid material would suffice, so long as the mounting element has sufficient flexibility to conform to the surface of the wall.

Further, any width of material will allow the teachings of the present invention to be employed.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A water heater anchoring device comprising:

multiple bracket elements which are adjustable in length, the brackets each including two separate elements, a water heater attachment element and a wall stud attachment element, the attachment elements each including a series of corresponding holes whereby the length of the bracket elements may be adjusted by changing the relative positions of the attachment elements, then anchoring the bracket in the desired position by inserting one or more bolts through corresponding holes;

the brackets further including integral loops which are attached to inlet and outlet water pipes, and a mounting means which is flexible at an end where it is attached to a wall stud to accommodate various angles of attachment, so as to allow secure attachment of the water heater to the wall stud.

* * * * *